United States Patent
Lopes et al.

(10) Patent No.: US 10,654,695 B1
(45) Date of Patent: May 19, 2020

(54) CLUTCH ASSEMBLY FOR DETECTING AND MEASURING SLIP USING PROXIMITY SENSORS

(71) Applicant: Goodrich Corporation, Charlotte, NC (US)

(72) Inventors: David R Lopes, Fullerton, CA (US); Bejan Maghsoodi, Diamond Bar, CA (US); Zachary Limas, Diamond Bar, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 59 days.

(21) Appl. No.: 16/197,768

(22) Filed: Nov. 21, 2018

(51) Int. Cl.
| | |
|---|---|
| *B66D 1/54* | (2006.01) |
| *B66D 1/48* | (2006.01) |
| *B66D 1/12* | (2006.01) |
| *B66D 1/16* | (2006.01) |
| *F16D 7/02* | (2006.01) |

(52) U.S. Cl.
CPC ............... *B66D 1/54* (2013.01); *B66D 1/12* (2013.01); *B66D 1/16* (2013.01); *B66D 1/485* (2013.01); *F16D 7/027* (2013.01)

(58) Field of Classification Search
CPC ... B66D 1/12; B66D 1/14; B66D 1/16; B66D 1/54; B66D 1/56; B66D 1/48; B66D 1/485; F16D 7/027
See application file for complete search history.

(56) References Cited

U.S. PATENT DOCUMENTS

| | | | |
|---|---|---|---|
| 2,459,948 A | 4/1946 | Lobelle | |
| 2,702,677 A | 2/1955 | Replogle | |
| 3,437,294 A | 4/1969 | Martin | |
| 4,361,312 A * | 11/1982 | Schreyer | B66D 5/30 254/276 |
| 4,636,962 A * | 1/1987 | Broyden | B66D 1/485 212/281 |
| 5,911,410 A | 6/1999 | Wullimann | |
| 5,970,906 A * | 10/1999 | Hrescak | B63B 23/50 114/378 |
| 6,135,421 A * | 10/2000 | Bartelme | B66D 1/56 254/268 |
| 7,063,306 B2 * | 6/2006 | Sanders | B66D 1/485 254/361 |
| 9,016,665 B2 | 4/2015 | Lin et al. | |
| 9,017,219 B2 * | 4/2015 | Cahill | B64C 25/405 244/111 |
| 9,073,530 B2 * | 7/2015 | Cahill | B60T 13/741 |
| 9,815,551 B2 * | 11/2017 | Drennen | B64C 25/36 |
| 2015/0151851 A1 * | 6/2015 | Lin | B64D 47/08 348/144 |
| 2018/0252616 A1 * | 9/2018 | Bryson | B66D 1/14 |

FOREIGN PATENT DOCUMENTS

| | | |
|---|---|---|
| CN | 102015031 | 2/2014 |
| JP | 2001316058 | 11/2001 |

* cited by examiner

*Primary Examiner* — Michael E Gallion
(74) *Attorney, Agent, or Firm* — Snell & Wilmer, L.L.P.

(57) ABSTRACT

A clutch assembly includes a first gear, a second gear, a first proximity sensor configured to determine a first number of teeth of the first gear that pass by the first proximity sensor within a period of time, and a second proximity sensor configured to determine a second number of teeth of the second gear that pass by the second proximity sensor within the period of time.

20 Claims, 6 Drawing Sheets

US 10,654,695 B1

CLUTCH ASSEMBLY FOR DETECTING AND MEASURING SLIP USING PROXIMITY SENSORS

FIELD

In general, this disclosure relates to hoists, and particularly to hoists having a clutch assembly.

BACKGROUND

Hoists are devices used to mechanically lift and/or lower loads (e.g., cargo, persons, etc.)—oftentimes by a motor-driven cable drum or lift-wheel (collectively referred to herein as a cable drum) around which a cable winds and/or unwinds. Referring generally, hoists can be operated electrically, hydraulically, manually, and/or pneumatically. They can apply a pulling force to the load through the cable in order to control and/or move the load from one physical location to another physical location. Many hoist assemblies have a lifting harness, hook, hoop, loop and/or other suitable attachment end (collectively referred to herein generally as a hook) at a distal end of the cable, which can be affixed and/or secured to the load. Referring generally, the cable drum is a fixed end of the cable, and the hook is an opposing, free end of the cable.

Hoists are used in many environments, including aircraft, automobile, and truck applications, as well as anchor systems, cable cars, cranes, elevators, escalators, mine operations, moving sidewalks, rope tows, ski lifts, tethers, etc. Accordingly, hoists can be mounted to an aircraft, such as a helicopter, and/or in various other applications, configurations, platforms, etc. as well.

SUMMARY

In various embodiments: a clutch assembly includes at least a first gear; a second gear; a first proximity sensor configured to determine a first number of teeth of the first gear that pass by the first proximity sensor within a period of time; and a second proximity sensor configured to determine a second number of teeth of the second gear that pass by the second proximity sensor within the period of time.

In various embodiments, the clutch assembly comprises a non-slip condition if the first number of teeth that pass by the first proximity sensor corresponds to the second number of teeth that pass by the second proximity sensor; and/or the clutch assembly comprises the non-slip condition if the first number of teeth that pass by the first proximity sensor is equal to the second number of teeth that pass by the second proximity sensor; and/or the clutch assembly comprises a slip condition if the first number of teeth that pass by the first proximity sensor does not correspond to the second number of teeth that pass by the second proximity sensor; and/or the clutch assembly comprises the slip condition if the first number of teeth that pass by the first proximity sensor is not equal to the second number of teeth that pass by the second proximity sensor; and/or the first gear is a same size as the second gear; and/or the first gear and the second gear have a same number of teeth; and/or the clutch assembly is configured for use in an aircraft.

In various embodiments: a hoist for cable-reeling operations includes at least a motor in communication with a drive train in communication with a cable drum, the drive train comprising a clutch assembly, the clutch assembly having a first gear disposed towards the motor and a second gear disposed towards the cable drum, and the clutch assembly having a first proximity sensor configured to determine a first number of teeth of the first gear that pass by the first proximity sensor within a period of time and a second proximity sensor configured to determine a second number of teeth of the second gear that pass by the second proximity sensor within the period of time.

In various embodiments, the clutch assembly comprises a non-slip condition if the first number of teeth that pass by the first proximity sensor corresponds to the second number of teeth that pass by the second proximity sensor; and/or the clutch assembly comprises the non-slip condition if the first number of teeth that pass by the first proximity sensor is equal to the second number of teeth that pass by the second proximity sensor; and/or the clutch assembly comprises a slip condition if the first number of teeth that pass by the first proximity sensor does not correspond to the second number of teeth that pass by the second proximity sensor; and/or the clutch assembly comprises the slip condition if the first number of teeth that pass by the first proximity sensor is not equal to the second number of teeth that pass by the second proximity sensor; and/or the first gear is a same size as the second gear; and/or the first gear and the second gear have a same number of teeth; and/or the hoist is configured for use in an aircraft.

In various embodiments: a method for a processor to monitor a hoist having a clutch assembly within a drive train includes at least determining, by the processor, a first number of teeth of a first gear that pass by a first proximity sensor within a period of time; determining, by the processor, a second number of teeth of a second gear that pass by a second proximity sensor within the period of time; and comparing, by the processor, the first number of teeth that pass by the first proximity sensor to the second number of teeth that pass by the second proximity sensor to determine if the hoist is in a slip condition.

In various embodiments, the comparing comprises determining the slip condition if the first number of teeth that passed by the first proximity sensor does not correspond to the second number of teeth that passed by the second proximity sensor; and/or the comparing comprises determining the slip condition if the first number of teeth that passed by the first proximity sensor does not equal the second number of teeth that passed by the second proximity sensor; and/or the hoist is configured for use in an aircraft.

BRIEF DESCRIPTION OF THE DRAWINGS

The accompanying drawings illustrate various embodiments employing the principles described herein and are a part of the specification. The illustrated embodiments are meant for description only, and they do not limit the scope of the claims, and in which:

DETAILED DESCRIPTION

This detailed description of exemplary embodiments references the accompanying drawings, which show exemplary embodiments by way of illustration. While these exemplary embodiments are described in sufficient detail to enable those skilled in the art to practice this disclosure, it should be understood that other embodiments may be realized and that logical changes and adaptations in design and construction may be made in accordance with this disclosure and the teachings herein described without departing from the scope and spirit hereof. Thus, this detailed description is presented for purposes of illustration only and not of limitation.

In accordance with various aspects of this disclosure, systems and methods are described for detecting the occurrence of a slipped condition of a hoist, as well as a duration of the slipped condition, a length of slipped cable involved in the slip, etc.

Figure 1:
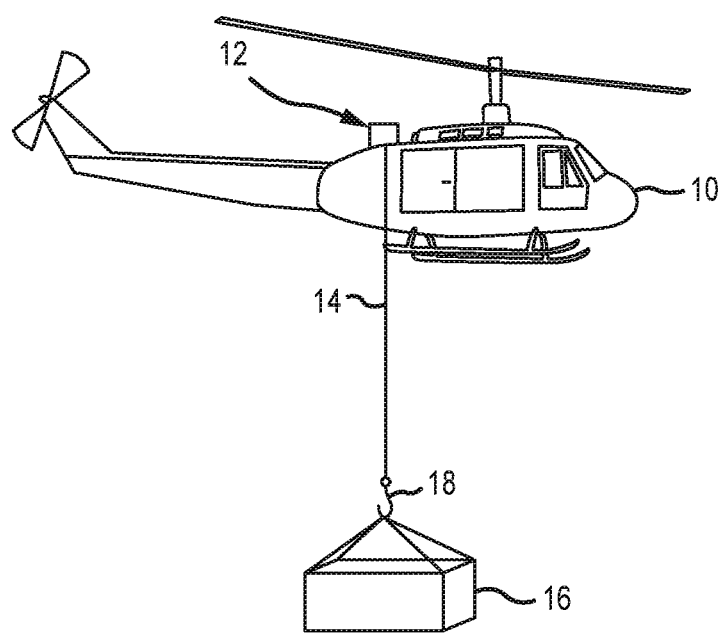
FIG. 1 is an isometric, representative illustration of an aircraft having a rescue hoist, in accordance with various embodiments.

Referring now to FIG. 1, an aircraft 10, such as a helicopter, is used, in various embodiments, for search and rescue missions, and in which a hoist 12 is attached to a support of the aircraft 10 and used to extend and/or retract (e.g., lower and/or raise, respectively) a cable 14 (aka a wire-rope) connected to a load 16 via a hook 18 and/or the like. In various embodiments, one or more crew members of the aircraft 10 operate the aircraft 10, while one or more crew members operate the hoist 12. In various embodiments, one or more crew members guide a distal, attachment end of the cable 14 (i.e., towards the hook 18) and/or the hook 18 to the load 16, including by directing the pilot(s) of the aircraft 10 on how, when, where, etc. to maneuver the aircraft 10. For example, to position the hook 18 directly and/or nearly directly over the load 16, crew members communicate position control information to the pilot(s), and the pilot(s) appropriately position(s) the aircraft 10 and/or the hook 18 relative to the load 16 in response, in various embodiments. In various embodiments, bad weather, cliff-side conditions, combat operations, dusty conditions, fire, gusting winds, nighttime operations, rolling seas, smoke, time sensitivities, etc. can benefit from heightened coordinated communication and skill. In various embodiments, this can apply equally during payout and retraction of the cable 14 from the hoist 12 of the aircraft 10.

In various embodiments, the load 16 placed on the hoist 12 can exceed a load rating for the hoist 12, thereby putting the aircraft 10, the hoist 12, and/or the load 16, etc. at risk.

Figure 2:
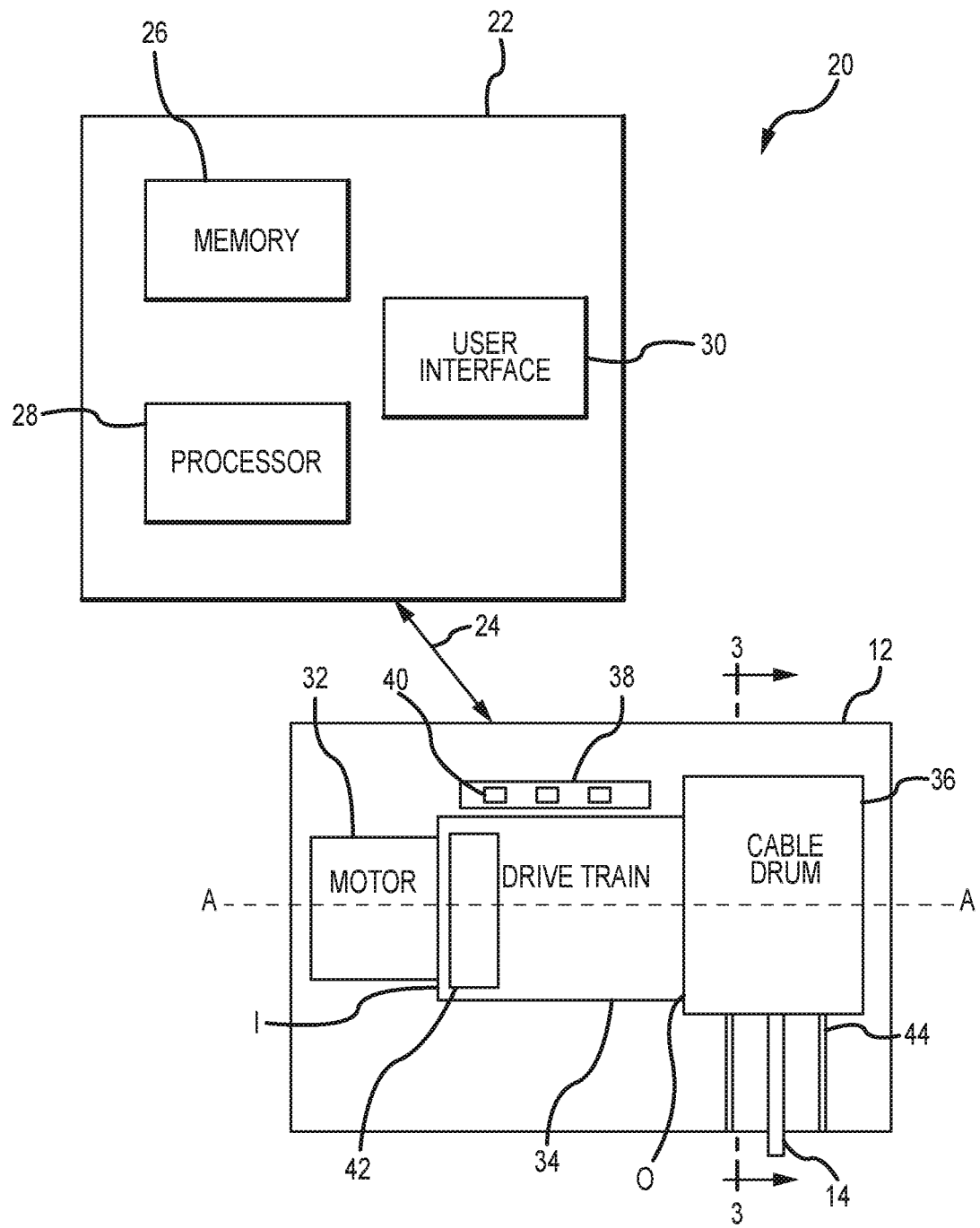
FIG. 2 is a schematic block diagram of a monitoring system including a computer and a hoist, in accordance with various embodiments.

Referring now also to FIG. 2, a system 20 includes, in various embodiments, the hoist 12 of FIG. 1 and a computer 22 connected by a communications link 24. In various embodiments, the hoist 12 and the computer 22 are configured to communicate with one another via the communications link 24. In various embodiments, the communications link 24 is a wired and/or wireless connection between the hoist 12 and the computer 22.

In various embodiments, the computer 22 includes a memory 26, a processor 28, and a user interface 30, the computer 22 configured to interact with and/or monitor the hoist 12. In various embodiments, the computer 22 comprises one or more of a computer, microcontroller, microprocessor, and/or other control logic.

In various embodiments, the memory 26 is configured to store information used in running the computer 22. In various embodiments, the memory 26 comprises a computer-readable storage medium, which, in various embodiments, includes a non-transitory storage medium. In various embodiments, the term "non-transitory" indicates that the memory 26 is not embodied in a carrier wave or a propagated signal. In various embodiments, the non-transitory storage medium stores data that, over time, changes (e.g., such as in a random access memory (RAM) or a cache memory). In various embodiments, the memory 26 comprises a temporary memory. In various embodiments, the memory 26 comprises a volatile memory. In various embodiments, the volatile memory includes one or more of RAM, dynamic RAM (DRAM), static RAM (SRAM), and/or other forms of volatile memories. In various embodiments, the memory 26 is configured to store computer program instructions for execution by the processor 28. In various embodiments, applications and/or software running on the computer 22 utilize the memory 26 in order to temporarily store information used during program execution. In various embodiments, the memory 26 includes one or more computer-readable storage media. In various embodiments, the memory 26 is configured to store larger amounts of information than volatile memory. In various embodiments, the memory 26 is configured for longer-term storage of information. In various embodiments, the memory 26 includes non-volatile storage elements, such as, for example, electrically programmable memories (EPROM), electrically erasable and programmable (EEPROM) memories, flash memories, floppy discs, magnetic hard discs, optical discs, and/or other forms of memories.

In various embodiments, the processor 28 is configured to implement functionality and/or process instructions. In various embodiments, the processor 28 is configured to process computer instructions stored in the memory 26. In various embodiments, the processor 28 includes one or more of a microprocessor, a controller, a digital signal processor (DSP), an application specific integrated circuit (ASIC), a field-programmable gate array (FPGA), or other equivalent discrete or integrated logic circuitry.

In various embodiments, the user interface 30 comprises one or more of a dial, display, joystick, keypad, pendant, screen, touchscreen, etc., and/or any other suitable interface device(s) that is/are configured to allow a user to interact with the hoist 12, the system 20, and/or the computer 22, such as by initiating and/or running software stored in the memory 26, inputting additional information to the memory 26, receiving notifications stored in, and/or passing through, the memory 26, and/or retrieving information from the memory 26, etc.

In various embodiments, the hoist 12 includes a motor 32, a drive train 34, and a cable drum 36, the drive train 34 disposed intermediate the motor 32 and the cable drum 36. In various embodiments, the motor 32 is electrically and/or hydraulically driven. In various embodiments, the hoist 12 also includes one or more sensors 38 disposed within the hoist 12, the sensors 38 including, in various embodiments, one or more slip sensors 40 that are configured to monitoring a clutch assembly 42 of the drive train 34.

In various embodiments, the cable drum 36 is configured to rotate about a cable drum axis A-A in order to deploy and/or retrieve the cable 14 from the cable drum 36. In various embodiments, the motor 32 is configured to provide rotational power to the cable drum 36 via the drive train 34.

In various embodiments, the drive train 34 comprises a plurality of gears interfacing between the motor 32 and the cable drum 36, such as a planetary gear system. In various embodiments, one or more of the motor 32 and/or the drive train 34 are configured to rotate the cable drum 36 about the cable drum axis A-A.

Figure 3:
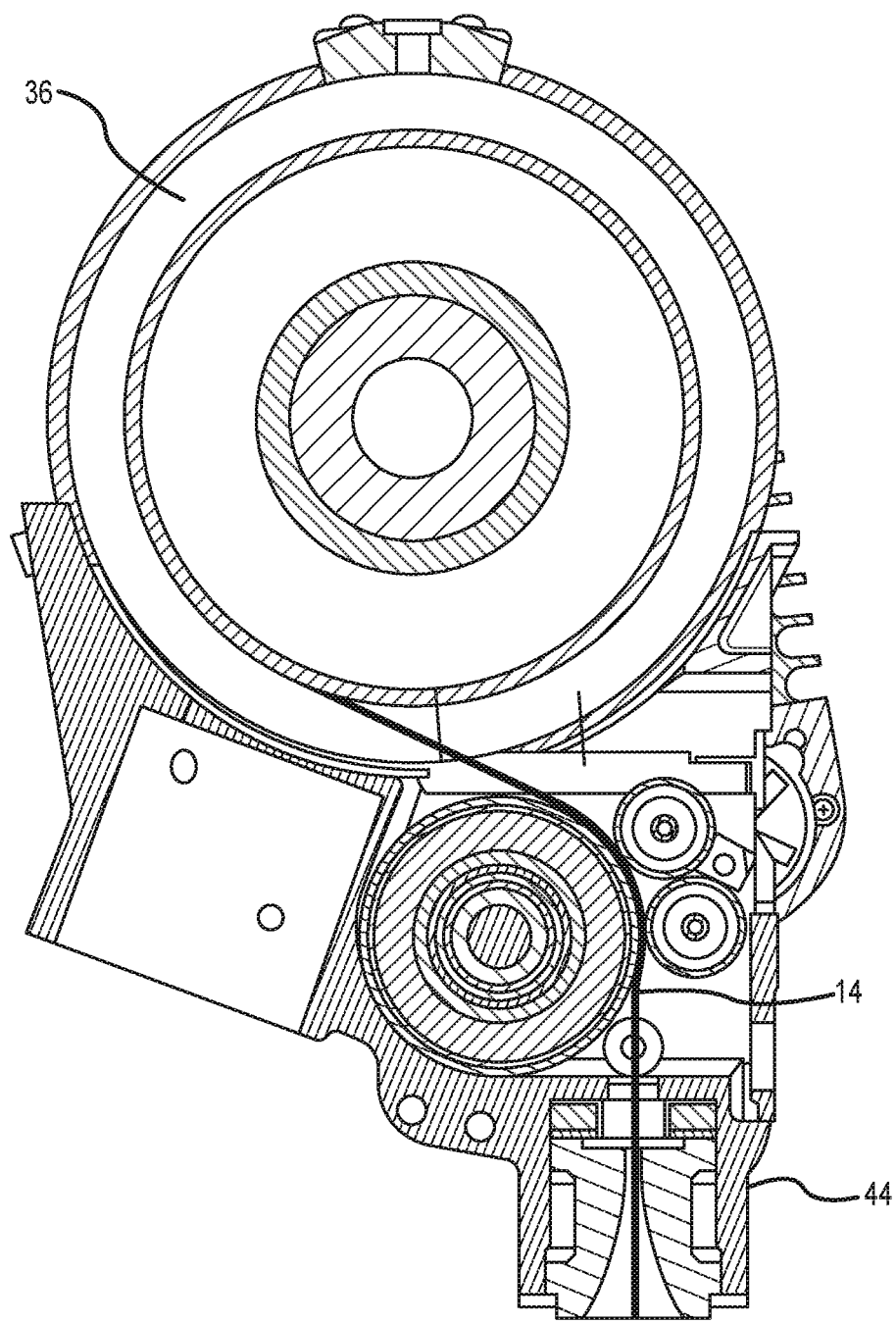
FIG. 3 is a side cross-sectional view of the hoist of FIG. 2, taken along line 3-3 in FIG. 2, in accordance with various embodiments.

Referring now also to FIGS. 2-3, the cable 14 is, in various embodiments, wound and/or unwound about the cable drum 36 and configured to exit from the hoist 12 through a cable exit 44 at a distal end of the hoist 12.

In various embodiments, and referring again also to FIG. 2, the drive train 34 includes the clutch assembly 42, which is configured to provide overload protection to the hoist 12, to objects supported by the hoist 12 (e.g., the load 16) and/or to objects supporting the hoist 12 (e.g., the aircraft 10). In various embodiments, the clutch assembly 42 includes a plurality of friction discs that are configured to slip at predetermined load levels, such as twice a rated capacity of the hoist 12. When the friction discs of the clutch assembly 42 slip, they disconnect the motor 32 from the cable drum 36, allowing the cable drum 36 to rotate freely (i.e., independently of the motor 32 and/or the drive train 34) and un-spool the cable 14 in response to the overload condition. In various embodiments, the friction discs are made from steel and/or comprise a steel disc therebetween.

Prior to the slip condition, the friction discs of the clutch assembly 42 act in unison, such as acting as a rigid member and/or translating rotational motion within the drive train 34 as a component of the drive train 34. However, the friction discs are configured to slip relative to each other when the load 16 on the cable 14 exceeds a slip threshold. For example, in various embodiments, a slip threshold defined by the friction discs is approximately twice a rated load 16 capacity of the hoist 12—e.g., if the hoist 12 has a rated load capacity of 600 pounds (272 kg), the clutch assembly 42, in various embodiments, is configured to slip if forces exerted on the hoist 12 exceed approximately 1,200 pounds (544 kg), with approximately meaning, in this case only, plus or minus 10%. As such, the clutch assembly 42 is configured to intentionally slip in order to allow the cable 14 to unspool from the cable drum 36 during an overload condition, including without damaging the aircraft 10, the hoist 12, the load 16, and/or other equipment.

Referring still to FIG. 2, the sensors 38 within the hoist 12 are configured, in various embodiments, to monitor various conditions of the hoist 12. For example, in various embodiments, the sensors 38 are configured to sense the rotation of the cable drum 36 about the cable drum axis A-A and/or a length of the cable 14 deployed from the cable drum 36, including when in communication and/or cooperation with the computer 22 via the communications link 24.

In various embodiments, the sensors 38 also include the slip sensor 40, which is configured to detect when the friction discs of the clutch assembly 42 slip. In various embodiments, the slip sensor 40 includes any suitable device for sensing slip of the clutch assembly 42. For example, in various embodiments, the slip sensor 40 includes vibration sensors, configured to sense vibration profiles created by the friction discs slipping relative to each other. In various embodiments, the slip sensor 40 counts various gear rotations within the drive train 34, as elaborated upon herein. In various embodiments, the slip sensor 40 comprises transducers, such as Hall effect sensors, and/or capacitive sensors, and/or optical sensors, etc.

Figure 4:
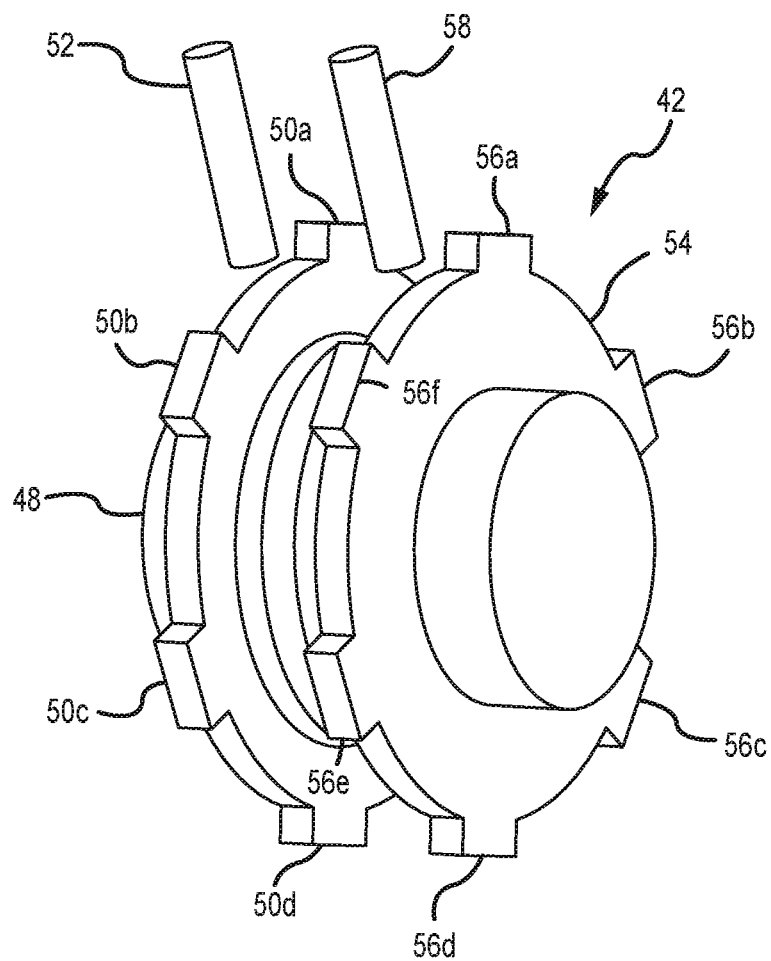
FIG. 4 is a perspective view of a clutch assembly and proximity sensors of the clutch assembly of FIG. 2, in accordance with various embodiments.

Referring now also to FIG. 4, the clutch assembly 42 includes a first gear 48 disposed towards the motor 32 of FIG. 2 (i.e., towards an input end I of the drive train 34). In various embodiments, the first gear 48 comprises a carrier disposed on the input end I of the drive train 34. In various embodiments, the first gear 48 has a first number of teeth 50, such as six teeth 50, labelled as 50a, 50b, 50c, 50d, 50e, and 50f within the figure. In various embodiments, the first gear 48 has more or less than six teeth 50, with the first number of teeth 50 chosen to correspond to a desired level of resolution available from the clutch assembly 42. In various embodiments, the teeth 50a-50f are distributed on an outside of the perimeter of the first gear 48 in a symmetrical pattern for weight balancing, such as placing the six teeth 50 sixty degrees apart from one another. In various embodiments, the first gear 48 comprises as few as one or two teeth 50, or as many as ten or twelve or more teeth 50. In various embodiments, the slip sensor 40 of FIG. 2 includes a first proximity sensor 52 configured to determine the first number of teeth 50 that pass by the first proximity sensor 52.

In various embodiments, the clutch assembly 42 also includes a second gear 54 disposed towards the cable drum 36 of FIG. 2 (i.e., towards an output end O of the drive train 34). In various embodiments, the second gear 54 comprises a pressure plate disposed on the output end O of the drive train 34. In various embodiments, the second gear 54 has a second number of teeth 56, such as six teeth 56, labelled as 56a, 56b, 56c, 56d, 56e, and 56f within the figure. In various embodiments, the second gear 54 has more or less than six teeth 56, with the second number of teeth 56 chosen to correspond to a desired level of resolution available from the clutch assembly 42. In various embodiments, the teeth 56a-56f are distributed on an outside of the perimeter of the second gear 54 in a symmetrical pattern for weight balancing, such as placing the six teeth 56 sixty degrees apart from one another. In various embodiments, the second gear 54 comprises as few as one or two teeth 56, or as many as ten or twelve or more teeth 56. In various embodiments, the slip sensor 40 of FIG. 2 includes a second proximity sensor 58 configured to determine the second number of teeth 56 that pass by the second proximity sensor 58.

In various embodiments, the first gear 48 and the second gear 54 are a same size (e.g., they have the same, or approximately the same, radii). In various embodiments, the first number of teeth 50 of the first gear 48 is the same as the second number of teeth 56 of the second gear 54. In various embodiments, the computer 22 is configured to make appropriate calculations to accommodate a differently size first gear 48 and second gear 54, as well as a different first number of teeth 50 and second number of teeth 56.

In various embodiments, when the first number of teeth 50 passing by the first proximity sensor 52 corresponds with (e.g., matches) the second number of teeth 56 passing by the second proximity sensor 58, the hoist 12 is in a no slip condition. However, if the clutch assembly 42 has slipped, then the first number of teeth 50 passing by the first proximity sensor 52 will not correspond with (e.g., will not match) the second number of teeth 56 passing by the second proximity sensor 58, in various embodiments.

Figure 5:
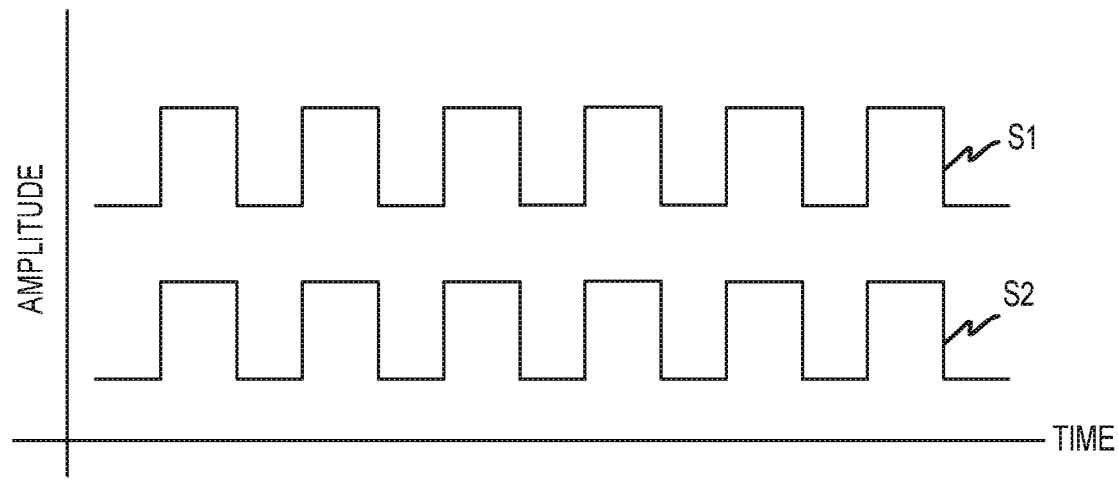
FIG. 5 depicts a first example output of the clutch assembly of FIG. 4, such as when the motor and the cable drum of FIG. 2 are synchronized (i.e., no slip), in accordance with various embodiments.

Referring now also to FIG. 5, a first output signal $S_1$ of the first proximity sensor 52 depicts the first number of teeth 50 passing by the first proximity sensor 52 from the first gear 48 over a period of time, with each square tooth amplitude corresponding to a different one of the first number of teeth 50. For example, six amplitude peaks correspond to one revolution of the first gear 48 comprising the first number of teeth 50. Likewise, a second output signal $S_2$ of the second proximity sensor 58 depicts the second number of teeth 56 passing by the second proximity sensor 58 from the second gear 54 over the period of time, with each square tooth amplitude corresponding to a different one of the second number of teeth 56. For example, six amplitude peaks correspond to one revolution of the second gear 54 comprising the second number of teeth 56. In this example, since the first output signal $S_1$ corresponds to (e.g., matches) the second output signal $S_2$, the computer 22 concludes the motor 32 and the cable drum 36 have not slipped relative to one another.

Figure 6:
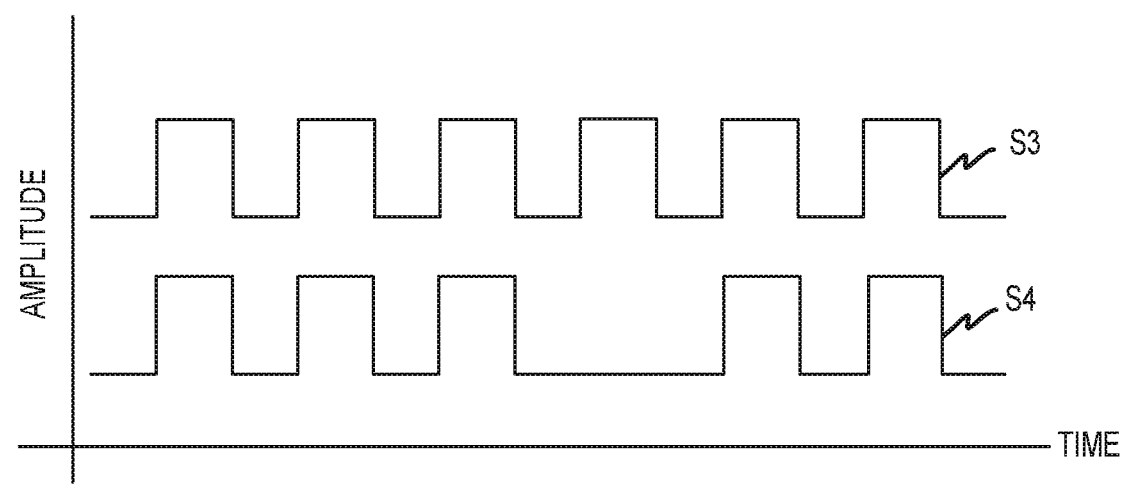
FIG. 6 depicts a second example output of the clutch assembly of FIG. 4, such as when the motor and the cable drum of FIG. 2 are not synchronized (i.e., a slipped condition), in accordance with various embodiments.

Referring now also to FIG. 6, a third output signal $S_3$ of the first proximity sensor 52 depicts the first number of teeth 50 passing by the first proximity sensor 52 from the first gear 48 over a period of time, with each square tooth amplitude corresponding to a different one of the first number of teeth 50. For example, six amplitude peaks correspond to one revolution of the first gear 48 comprising the first number of teeth 50. Likewise, a fourth output signal $S_4$ of the second proximity sensor 58 depicts the second number of teeth 56 passing by the second proximity sensor 58 from the second gear 54 over the period of time, with each square tooth amplitude corresponding to a different one of the second number of teeth 56. For example, while six amplitude peaks correspond to one revolution of the second gear 54 comprising the second number of teeth 56, the fourth signal $S_4$ represents that only five teeth 56 from the second gear 54 passed by the second proximity sensor 58 (corresponding to the five (or fewer) amplitude peaks shown by the fourth signal $S_4$). In this example, since the third output signal $S_3$ does not correspond to (e.g., does not match) the fourth output signal $S_4$, the computer 22 concludes the motor 32 and the cable drum 36 have slipped relative to one another.

In accordance with the foregoing, the slip sensor 40 counts the number of gear rotations of the first gear 48 and the second gear 54 to detect the presence or absence of a slip condition between the motor 32 and the cable drum 36. Accordingly, the slip sensor 40 monitors the clutch assembly 42 to determine if the friction discs of the clutch assembly 42 have slipped. In various embodiments, the slip sensor 40 communicates slippage information to the computer 22 via the communications link 24, and the slippage information is stored within the memory 26, in various embodiments.

In various embodiments, and referring again to FIG. 2, the computer 22 receives, and the memory 26 stores, information from the slip sensor 40 corresponding to the slippage between the motor 32 and the cable drum 36 (e.g., teeth counts and/or alignments and/or misalignments therebetween), including the existence of a slipped condition, a time of a slippage, a duration of a slippage, an amount of cable 14 that slipped, a force and/or weight of the load 16 on the cable 14 at the time of slippage, etc. In various embodiments, the information from the slip sensor 40 is stored in the memory 26 for display on the user interface 30, and/or for subsequent reference, and/or for diagnostics and/or monitoring of the aircraft 10, the hoist 12, the system 20, etc.

In various embodiments, the computer 22 monitors the output signals from the first proximity sensor 52 and the output signals from the second proximity sensor 58 for comparison(s) therebetween. Accordingly, if the clutch assembly 42 is slipping, the computer 22 detects, via the first proximity sensor 52 and the second proximity sensor 58, that the teeth counts are no longer symmetrical, indicating a slipped condition, and it generates a corresponding signal via the memory 26 and/or the user interface 30. By counting discrepancies, if any, between opposing sides of the clutch assembly 42, as corresponding to differences between the input end I and the output end O of the drive train 34, the processor 28 of the computer 22 is configured to calculate various parameters related to the slippage, including as related to the first number of teeth 50 of the first gear 48 that passed by the first proximity sensor 52 and the second number of teeth 56 of the second gear 54 that passed by the second proximity sensor 58.

In various embodiments, the slip condition is presented to crewmembers of the aircraft 10 for remediation, including in real-time as the slip condition is present in order to be able to mitigate a hazard it may present. In various embodiments, the parameters of the slip condition are stored within the memory 26 for subsequent review and/or diagnostic action.

Figure 7:
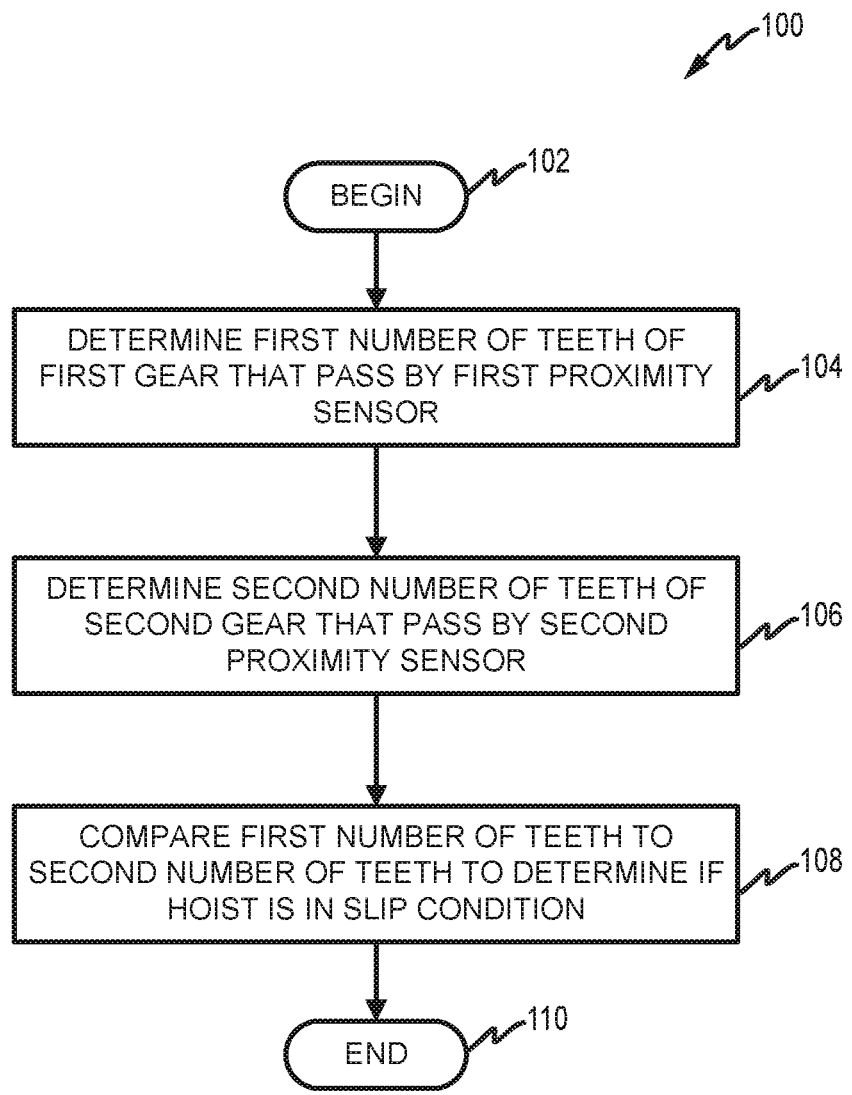
FIG. 7 depicts a simplified method of operating the hoist of FIGS. 1-3, in accordance with various embodiments.

Referring now also to FIG. 7, and/or in various embodiments, a method 100 for monitoring the hoist 12 having the clutch assembly 42 within the drive train 34 begins in a step 102, after which the first number of teeth 50 of the first gear 48 that pass by the first proximity sensor 52 is determined within a period of time at a step 104. In addition, the second number of teeth 56 of the second gear 54 that pass by the second proximity sensor 58 is determined within the period of time at a step 106. Thereafter, the computer 22 monitors if the hoist 12 is in the slip condition by comparing the first number of teeth 50 that passed by the first proximity sensor 52 to the second number of teeth 56 that passed by the second proximity sensor 58 in a step 108. For example, if the first number of teeth 50 of the first gear 48 corresponds with (e.g., matches) the second number of teeth 56 of the second gear 54, then the computer 22 determines the clutch assembly 42 is not a slip condition, and/or if the first number of teeth 50 of the first gear 48 does not correspond with (e.g., does not match) the second number of teeth 56 of the second gear 54, then the computer 22 determines that the clutch assembly 42 is in a slip condition, for which an alarm can be generated, in various embodiments, via the user interface 30, and/or various parameters regarding the slip condition can be stored within the memory 26 of the computer 22. In various embodiments, the various parameters include at least one or more of the existence of the slipped condition, a time of the slippage, a duration of the slippage, an amount of cable 14 that slipped, a force and/or weight of the load 16 on the cable 14 at the time of slippage, etc. Thereafter, the method 100 ends at a step 110, in various embodiments.

In accordance with the description herein, various technical benefits and effects of this disclosure include monitoring a slip condition of the hoist 12 using the slip sensor 40 disposed about the clutch assembly 42 within the drive train 34 intermediate the motor 32 and the cable drum 36 of the hoist 12. By interfacing the hoist 12 with the computer 22 via the communications link 24, the computer 22 monitors any slippage of the hoist 12, which, in various embodiments, subjects the hoist 12 to remedial action and/or enables removal of a hazardous condition at the aircraft 10, the hoist 12, the load 16, and/or other equipment.

Advantages, benefits, improvements, and solutions, etc. have been described herein with regard to specific embodiments. Furthermore, connecting lines shown in the various figures contained herein are intended to represent exemplary functional relationships and/or physical couplings between the various elements. It should be noted that many additional and/or alternative functional relationships or physical connections may be present in a practical system. However, the advantages, benefits, improvements, solutions, etc., and any elements that may cause any advantage, benefit, improvement, solution, etc. to occur or become more pronounced are not to be construed as critical, essential, or required elements or features of this disclosure.

The scope of this disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural, and vice-versa. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching may be used throughout the figures to denote different parts, but not necessarily to denote the same or different materials. Like depictions and numerals also generally represent like elements.

The steps recited in any of the method or process descriptions may be executed in any order and are not necessarily limited to the order presented. Furthermore, any reference to singular elements, embodiments, and/or steps includes plurals thereof, and any reference to more than one element, embodiment, and/or step may include a singular one thereof. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, connected, fixed, or the like may include full, partial, permanent, removable, temporary and/or any other possible attachment option. Additionally, any reference to without contact (or similar phrases) may also include reduced contact or minimal contact. Surface shading lines may be used throughout the figures to denote different areas or parts, but not necessarily to denote the same or different materials. In some cases, reference coordinates may or may not be specific to each figure.

Apparatus, methods, and systems are provided herein. In the detailed description herein, references to "one embodiment," "an embodiment," "various embodiments," etc., indicate that the embodiment described may include a particular characteristic, feature, or structure, but every embodiment may not necessarily include this particular characteristic, feature, or structure. Moreover, such phrases may not necessarily refer to the same embodiment. Further, when a particular characteristic, feature, or structure is described in connection with an embodiment, it is submitted that it is within the knowledge of one skilled in the art to affect such characteristic, feature, or structure in connection with other embodiments, whether or not explicitly described. After reading the description, it will be apparent to one skilled in the relevant art(s) how to implement this disclosure in alternative embodiments.

Furthermore, no component, element, or method step in the present disclosure is intended to be dedicated to the public regardless of whether the component, element, or method step is explicitly recited in the claims. No claim element is intended to invoke 35 U.S.C. § 112(f) unless the element is expressly recited using the phrase "means for." As used herein, the terms "comprises," "comprising," or any other variation thereof, are intended to cover a non-exclusive inclusion, such that an apparatus, article, method, or process that comprises a list of elements does not include only those elements, but it may also include other elements not expressly listed or inherent to such apparatus, article, method, or process.

What is claimed is:

1. A clutch assembly, comprising:
   a first gear;
   a second gear;
   a first proximity sensor configured to determine a first number of teeth of the first gear that pass by the first proximity sensor within a period of time; and
   a second proximity sensor configured to determine a second number of teeth of the second gear that pass by the second proximity sensor within the period of time.

2. The clutch assembly of claim 1, wherein the clutch assembly comprises a non-slip condition if the first number of teeth that pass by the first proximity sensor corresponds to the second number of teeth that pass by the second proximity sensor.

3. The clutch assembly of claim 2, wherein the clutch assembly comprises the non-slip condition if the first number of teeth that pass by the first proximity sensor is equal to the second number of teeth that pass by the second proximity sensor.

4. The clutch assembly of claim 1, wherein the clutch assembly comprises a slip condition if the first number of teeth that pass by the first proximity sensor does not correspond to the second number of teeth that pass by the second proximity sensor.

5. The clutch assembly of claim 4, wherein the clutch assembly comprises the slip condition if the first number of teeth that pass by the first proximity sensor is not equal to the second number of teeth that pass by the second proximity sensor.

6. The clutch assembly of claim 1, wherein the first gear is a same size as the second gear.

7. The clutch assembly of claim 1, wherein the first gear and the second gear have a same number of teeth.

8. The clutch assembly of claim 1, wherein the clutch assembly is configured for use in an aircraft.

9. A hoist for cable-reeling operations, comprising:
   a motor in communication with a drive train in communication with a cable drum,
   the drive train comprising a clutch assembly,
   the clutch assembly having a first gear disposed towards the motor and a second gear disposed towards the cable drum, and
   the clutch assembly having a first proximity sensor configured to determine a first number of teeth of the first gear that pass by the first proximity sensor within a period of time and a second proximity sensor configured to determine a second number of teeth of the second gear that pass by the second proximity sensor within the period of time.

10. The hoist of claim 9, wherein the clutch assembly comprises a non-slip condition if the first number of teeth that pass by the first proximity sensor corresponds to the second number of teeth that pass by the second proximity sensor.

11. The hoist of claim 10, wherein the clutch assembly comprises the non-slip condition if the first number of teeth that pass by the first proximity sensor is equal to the second number of teeth that pass by the second proximity sensor.

12. The hoist of claim 9, wherein the clutch assembly comprises a slip condition if the first number of teeth that pass by the first proximity sensor does not correspond to the second number of teeth that pass by the second proximity sensor.

13. The hoist of claim 12, wherein the clutch assembly comprises the slip condition if the first number of teeth that pass by the first proximity sensor is not equal to the second number of teeth that pass by the second proximity sensor.

14. The hoist of claim 9, wherein the first gear is a same size as the second gear.

15. The hoist of claim 9, wherein the first gear and the second gear have a same number of teeth.

16. The hoist of claim 9, wherein the hoist is configured for use in an aircraft.

17. A method for a processor to monitor a hoist having a clutch assembly within a drive train, comprising:
- determining, by the processor, a first number of teeth of a first gear that pass by a first proximity sensor within a period of time;
- determining, by the processor, a second number of teeth of a second gear that pass by a second proximity sensor within the period of time; and
- comparing, by the processor, the first number of teeth that pass by the first proximity sensor to the second number of teeth that pass by the second proximity sensor to determine if the hoist is in a slip condition.

18. The method for the processor to monitor the hoist of claim 17, wherein the comparing comprises determining the slip condition if the first number of teeth that passed by the first proximity sensor does not correspond to the second number of teeth that passed by the second proximity sensor.

19. The method for the processor to monitor the hoist of claim 17, wherein the comparing comprises determining the slip condition if the first number of teeth that passed by the first proximity sensor does not equal the second number of teeth that passed by the second proximity sensor.

20. The method for the processor to monitor the hoist of claim 17, wherein the hoist is configured for use in an aircraft.

* * * * *